Feb. 2, 1965  J. M. MILROY, JR  3,167,876
HANDGUN
Filed Oct. 19, 1960  7 Sheets-Sheet 3
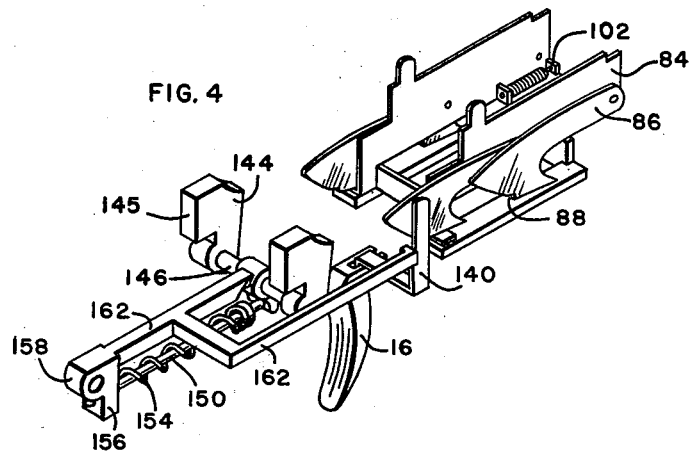
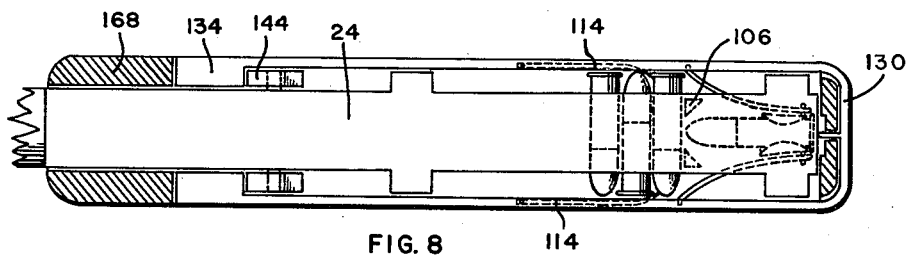
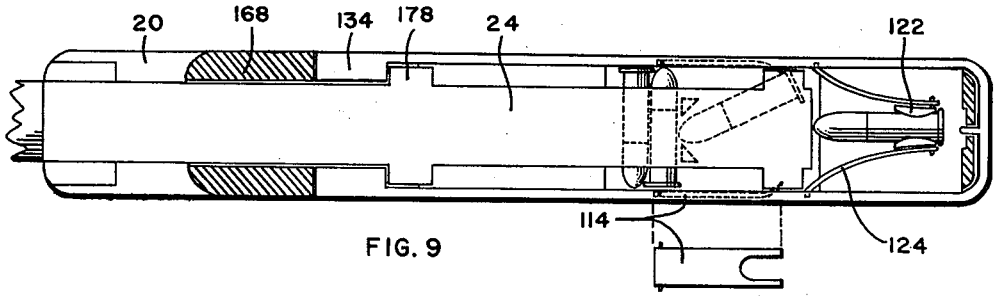
INVENTOR
John M. Milroy, Jr.
BY
ATTORNEYS Feb. 2, 1965    J. M. MILROY, JR    3,167,876
HANDGUN
Filed Oct. 19, 1960    7 Sheets-Sheet 4

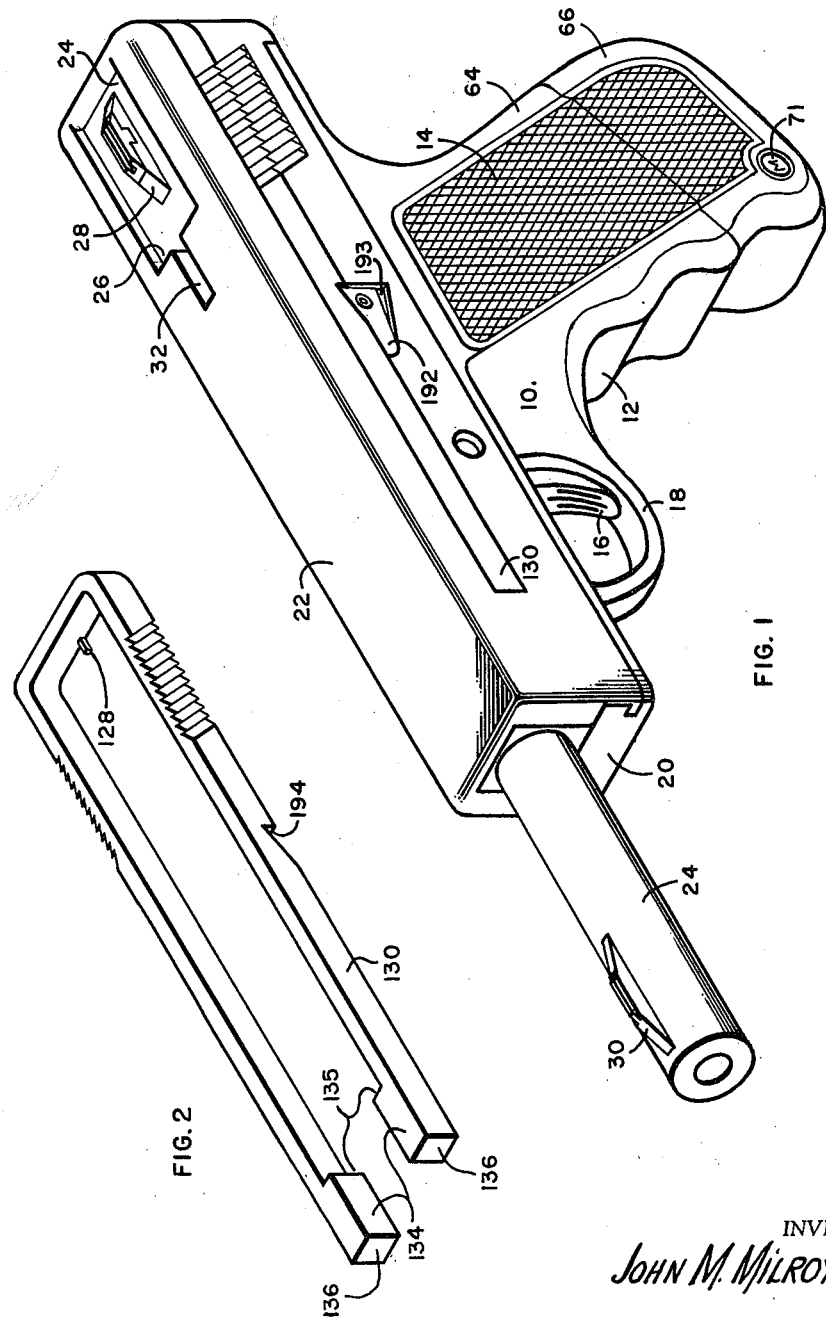

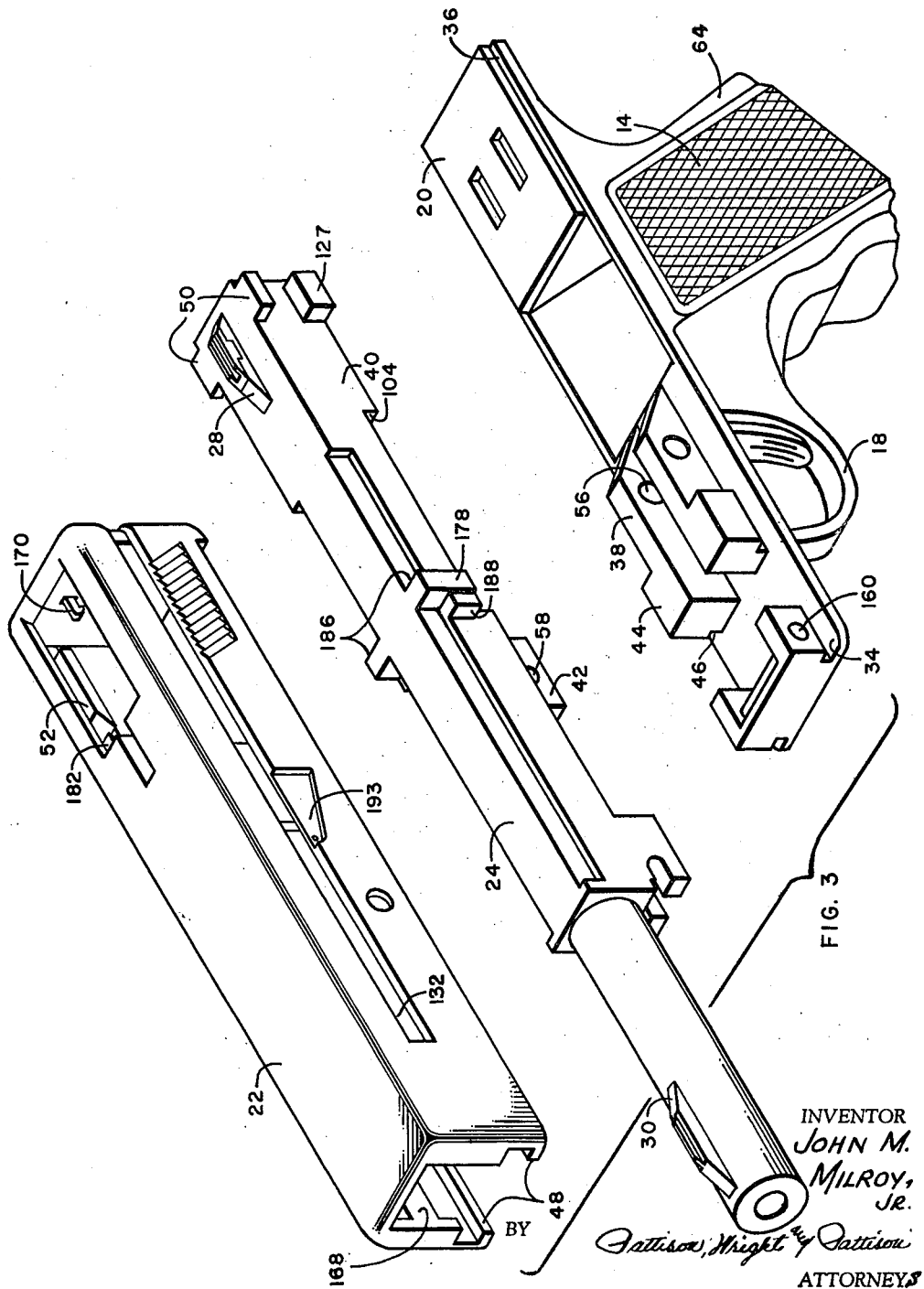

INVENTOR
John M. Milroy, Jr.
BY
Pattison, Wright & Pattison
ATTORNEYS

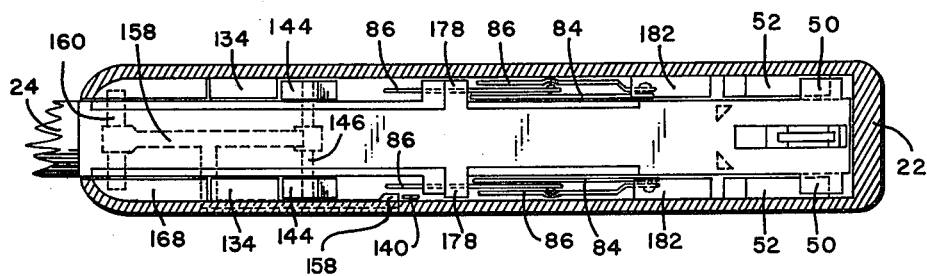
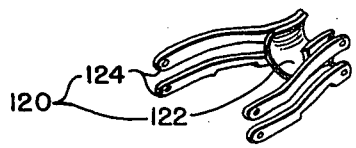
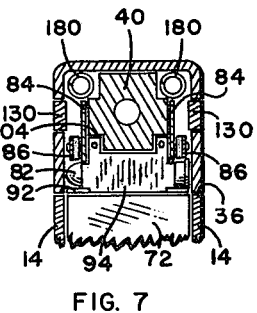
FIG. 22     FIG. 7
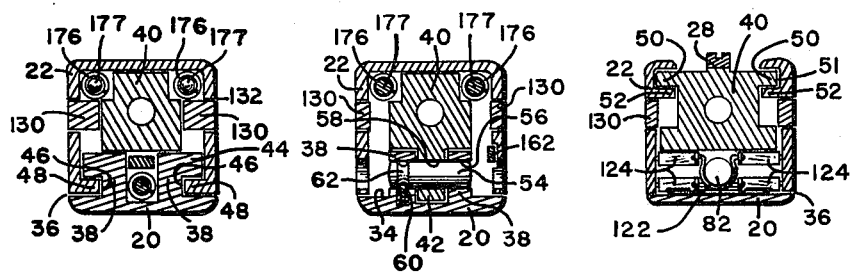
FIG. 10     FIG. 11     FIG. 12

Feb. 2, 1965   J. M. MILROY, JR   3,167,876
HANDGUN
Filed Oct. 19, 1960   7 Sheets-Sheet 6

INVENTOR
John M. Milroy, Jr.

BY
Pattison, Wright & Pattison
ATTORNEYS

United States Patent Office 3,167,876
Patented Feb. 2, 1965

3,167,876
HANDGUN
John M. Milroy, Jr., Wilson, Va.
(211 High St., Blackstone, Va.)
Filed Oct. 19, 1960, Ser. No. 63,656
15 Claims. (Cl. 42—7)

This invention relates to firearms and more particularly and specifically to a new and improved handgun or pistol.

The history of the handgun art evidences an ever increasing attempt to satisfy continuously increasing demands for guns having greater fire power, resulting in increased muzzle velocities and trajectories, increased magazine capacities, and greater facility and ease of handling. The prior art contains examples of substantial improvements which have been made in handgun design and balance, such as have been provided by extended barrel lengths and intermediately located handgrips, and improvements in positive, accurate feeding mechanisms to increase the rapidity of firing. However, even these prior art advances fail to achieve the maximum benefits and efficiencies necessary to present uses which will take full advantage of modern technicological advancements in projectiles and ordnance.

It is therefore a general object of the present invention to provide a handgun embodying completely novel and basic innovations in construction and operational functions so as to provide a fundamental contribution to the firearm art.

Another object of this invention is to provide a handgun construction affording the maximum barrel length to overall gun length ratio, whereby the optimum advantages are obtained from modern highspeed projectiles in terms of muzzle velocity, trajectory range, and accuracy.

Still a further object of this invention resides in the provisions of a novel handgun construction embodying basic innovations in magazine loading, storage and feeding characteristics which enable rapid and easy loading, maximum magazine capacity, and rapid positive feeding of projectiles to the firing chamber.

A still further and important object of this invention is the provision of a handgun construction having a magazine formed integrally in the handgrip of the gun which may be loaded directly from a cartridge box without regard to the directional placement of the cartridges in the magazine, and which provides for a capacity of fifty cartridges without incurring unmanageable and unbalanced gun bulk.

A still further object of this invention lies in the provision of a semi-automatic handgun which is constructed so as to permit quick and simple adjustment of the trigger tension without necessity of disassembling the gun, yet a handgun construction which may be readily disassembled for cleaning or repair by the simple removal of a single retaining pin.

Yet another object of this invention is the provision of a novel and safe handgun construction which permits cocking or uncocking of the gun without requiring prior ejection of a live shell and without incurring the danger of the firing of the live shell in the chamber at the time of uncocking.

Still another object is the provision of a handgun construction which is particularly adaptable to target shooting by reason of weight variations obtainable in the gun through regulation of the number of cartridges loaded in the grip magazine.

Still further structural and operational advantages of the present handgun will become more readily apparent to those skilled in the art when the following general statement and description of the present invention are read in the light of the accompanying drawings.

The nature of the present invention may be stated in general terms as relating to a handgun which includes a barrel and a receiver supported on a gun frame embodying a handgrip and trigger mechanism, a magazine in the handgrip supporting cartridges crosswise thereof in plural, vertical rows, a feed mechanism operable longitudinally of the frame above said grip magazine, means associated with said feed mechanism selectively orienting each successive cartridge moved thereby to proper feed position relative to the firing chamber, a hinged carrier receiving each sucessive cartridge and positioning said cartridge in firing position relative to the firing chamber, manual trigger means having operable connection to hammer means interposed between the barrel and receiver, a firing pin operable from said hammer means, and ejector means associated with and operating automatically in complement to said firing means.

Referring now to the accompanying drawings in which like numerals designate similar parts throughout the several views:

FIG. 1 is a perspective illustration of the handgun constituting the preferred embodiment of the present invention;

FIG. 2 is a perspective view of the firing member of the novel handgun;

FIG. 3 is an exploded view similar to FIG. 1 illustrating the receiver and barrel mount on the gun frame;

FIG. 4 is a perspective illustration of the trigger, hammer, sear and cartridge feed mechanism;

FIG. 7 is a vertical section in elevation illustrating the ratchet form feed member taken on line 7—7, FIG. 5;

FIG. 8 is a plan view in horizontal section illustrating the receiver and barrel in firing position;

FIG. 9 is a view similar to FIG. 8 with the receiver and barrel shown in recoil position;

FIG. 10 is a vertical section through the receiver and barrel taken on line 10—10, FIG. 5;

FIG. 11 is a view similar to FIG. 10 taken on line 11—11, FIG. 5;

FIG. 12 is a view similar to FIGS. 10 and 11 taken on line 12—12, FIG. 5;

FIG. 22 is a pictorial illustration of the cartridge carrier associated with the feed mechanism and the stop abutments of FIG. 15;

FIG. 23 is a view similar to FIG. 8 illustrating components of the pistol in rest position.

Figure 5:
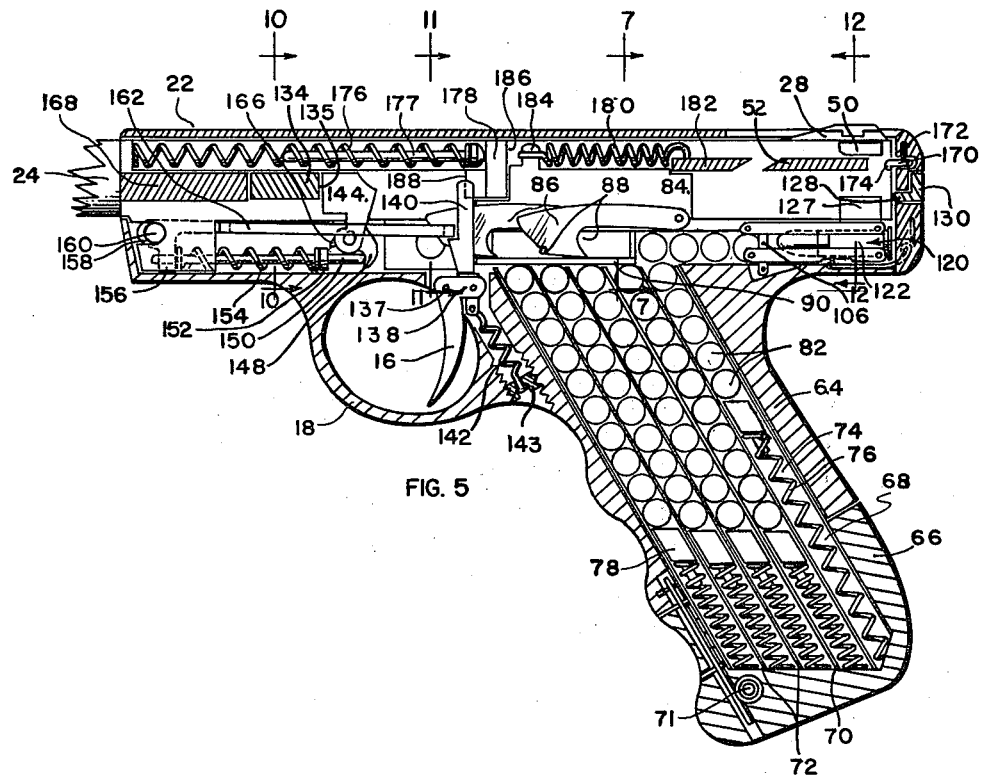
FIG. 5 is a side elevation in vertical section illustrating the operational positioning of the handgun components in uncocked condition.

Referring now to the accompanying drawings illustrating the preferred embodiment of my invention, 10 generally designates my novel handgun including a frame 12, embodying a handgrip 14, a trigger 16, trigger guard 18 and slide block 20. The receiver 22 is slidably supported on the block 20, and a barrel, generally designated 24, is longitudinally disposed within the receiver 22. As is best seen in FIG. 1 of the drawings the upper rearward portion of the receiver 22 is cut away as at 26, transversely of the gun and for a spaced distance longitudinally forward from the rear end thereof, to expose the upper surface of the rearward end of the barrel which carries a raised rear sight 28 operably cooperating with a raised forward sight on the barrel designated 30. The upper wall of the receiver is additionally cut away on its longitudinal centerline forwardly from the transversely cut-out portion 26 to provide a slot 32 in registry with and adapted to reciprocally receive therein the rear sight 28 on the barrel upon recoil action of the receiver relative to the barrel.

The details of the frame block, barrel and receiver are best illustrated in cooperative assembly in the sectional views constituting FIGS. 10 through 12 of the drawings wherein it is seen that the slide block 20 of the frame consists of an elongated block presenting a flat horizontal top surface 34 bounded by narrow flat longitudinal edge portions 36 throughout its length, and a pair of transversely spaced vertical blocks 38 formed integrally at a point intermediate the longitudinal length thereof. The barrel 24 consists of a tubular member 40 which is provided, through an intermediate section of its length, with a central, depending leg member 42. The receiver 22 consists generally of an elongated, inverted U-shaped section which is superimposed over the barrel assembly to seat the longitudinal edges thereof along the flat edge portions 36 of the frame block.

Specifically referring to FIG. 10 of the drawings it will be seen that the outside vertical face of each block 38 on the slide block 20 is provided with a horizontal projection 44 forming with the slide block 20 a horizontal slot or way 46 which slidably receives a complementary key member 48 formed on the adjacent wall of the receiver 22. Further, as seen in FIG. 12, the barrel is provided with side projecting keys 50 along the upper sides thereof forwardly of the rear end. These keys 50 slidably engage in ways 51 formed in the adjacent walls of the receiver 22. Hence, the front and rear keyed interlock of the barrel and receiver permits reciprocal movement of the receiver necessary to the recoil of the handgun.

Turning to FIG. 11 of the drawings, it is seen that the barrel 40, which slidably mounts the receiver 22 as hereinbefore described, is locked securely to the frame 20 of the handgun by means of an assembly pin 54 which is inserted horizontally through aligned openings 56 in the blocks 38 on the slide block and a circular passage 58 formed through the barrel member in the depending leg 42 thereof. The assembly pin 54 has formed therein a circular detent 62 which is positioned to receive a spring seated ball 60 located in slide block 20. The assembly pin thereby securely locks the barrel to the slide block of the frame in a rigid fixed position thereon.

Returning to FIGS. 3 and 5 of the drawings, it is seen that the handgrip 14 of the gun forms a cartridge magazine. The hand-grip is formed in two sections, namely, an extended grip portion 64 depending integrally from the frame of the gun at an angular disposition to and below the slide block portion thereof and spaced forwardly of the rearward end of the frame and slide block, and a second butt end portion 66 which is complementary to portion 64 and cooperates therewith to provide a closed bottom end to the first-named butt portion.

The uppermost portion 64 of the handgrip supports cooperatively with, and as a part of, the frame of the gun, the trigger guard 18 and trigger 16 conventionally positioned relative to the frame and the grip. The grip portion is hollow throughout its length providing communication at its upper end, through the slide block, with the receiver below the barrel of the gun and forwardly of the firing mechanism to be hereinafter described.

The butt portion 66 of the handgrip is provided with a top opening chamber 68 which is provided with an insert including a bottom plate 70 which supports six parallel spaced plates 72 extending thereabove at angular inclination coinciding with the angularity of the grip portion 64, and of lengths equal to the overall length of the interior of the two handgrip portions. The six plates 72 divide the hollow interior of the upper handgrip portion into five parallel slots 74. A coil spring 76 carrying a top mounted follower cap 78 is seated in the bottom end of each slot 74 on the bottom plate of the insert with each follower cap having oppositely projecting members 80, FIG. 13, slidably engaged in longitudinal slots in each adjacent plate or separator 72.

Figure 13:
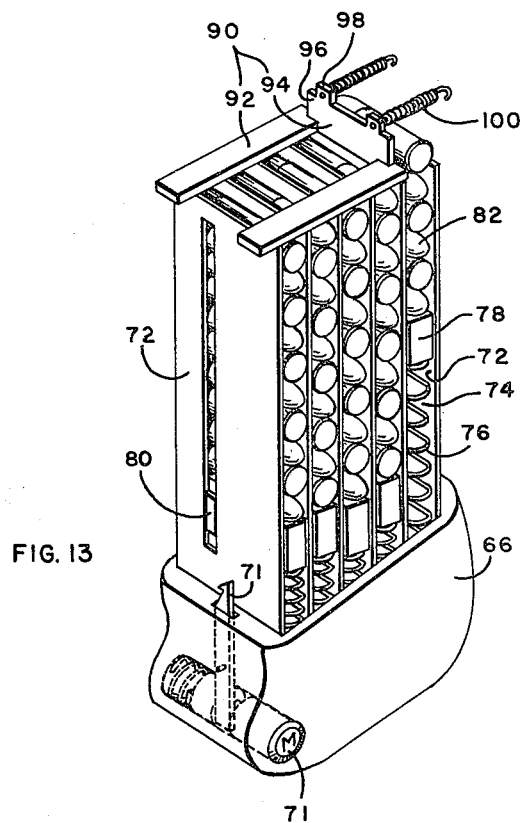
FIG. 13 is a perspective illustration of the magazine and associated feed bar.

As is best seen in FIGS. 5, 13 and 16 through 21, cartridges 82 are loaded in the upper section 64 of the handgrip whereupon the lower butt portion of the handgrip is moved to an end closing position telescopically inserting the separator plates 72 upwardly into the upper portion of the handgrip, where they are locked by spring button catch assembly 71, to divide the cartridges into five parallel rows each being spring seated against the bottom plate 70 in the butt chamber 68. The action of springs 76 serves to maintain the cartridges in each separated slot under bias in the direction of the receiver chamber and feed mechanism thereabove. Further, as is best seen in FIG. 13, the cartridges 82 are loaded in the plural slots of the magazine at random with regard to their end for end relationship. In fact, since these cartridges may be loaded by direct transfer from a cartridge box, they are found in the same alternative end for end relationship in the magazine as they are normally loaded in a box.

Referring in more particular to FIGS. 3, 4 and 5 of the drawings, it can be seen that in addition to the slidably interlocking ways and keys of the receiver and barrel hereinbefore described, there are additional cooperating components carried between the receiver and barrel to enable operation of the handgun. These additional components may be grouped in their order of functional sequence categorically as a feeding mechanism, a firing mechanism, and an ejection and reset mechanism.

*Feeding mechanism*

The feeding mechanism of the handgun comprises those components which cooperate to transfer a cartridge from one of the plural retaining slots of the magazine into firing position relative to the barrel and firing mechanism of the gun. Such components include, primarily, a feed member, a cartridge orientor, and a cartridge lift carrier.

The cartridge feed member consists of an elongated, generally U-shaped slide member 84, FIG. 7, which lies beneath a rearward portion of the barrel immediately above the bed plate of the frame. The slide member 84 carries along each vertical side thereof a plurality of ratchet segments 86, FIG. 23, each of which is pivotally secured to the slide to normally fall downward into juxtaposition with the slide and to present a forward-rearward engaging detent end 88, FIG. 5, on the lowermost end directly above the handgrip magazine. Disposed longitudinally of the receiver immediately over the magazine and beneath the slide member is a magazine hold-down plate 90, FIG. 13, which is U-shaped in plan view to provide two narrow, flat leg strips 92 longitudinally beneath the depending ends of the ratchet segments 86 on both sides of the slide member and to present a transverse strip 94 interconnecting the rearward ends of the longitudinal strips 92 beneath the barrel and the slide member 84. The transverse end strip 94 consists of a vertically disposed plate each end of which is seated on and secured to adjacent ends of the legs 92 of the magazine hold-down plate. The extreme ends 96 of the transverse end plate 94 terminate at positions inset from the outer side edges of the legs 92 a sufficient distance to permit the ratchet elements 86 of the feed mechanism to move freely by the ends of the transverse end plate while riding on the upper faces of the leg portions 92 of the hold-down member.

Further, the end plate 94 of the hold-down plate assembly 90 is provided with a pair of spaced upstanding ears 98 to which the forward ends of recoil springs 100 are secured. The rearward ends of the recoil springs are secured to vertical ears 102, FIG. 4, on the bottom plate of the feed member 84. Thus, both the vertical ears 98 and 102 slide freely within the undercut slot 104 in the underside of barrel 40, which is best illustrated in FIG. 3. The normal bias of recoil springs 100 urges hold-down plate 90 to move in a rearward direction.

Figures 14, 15:
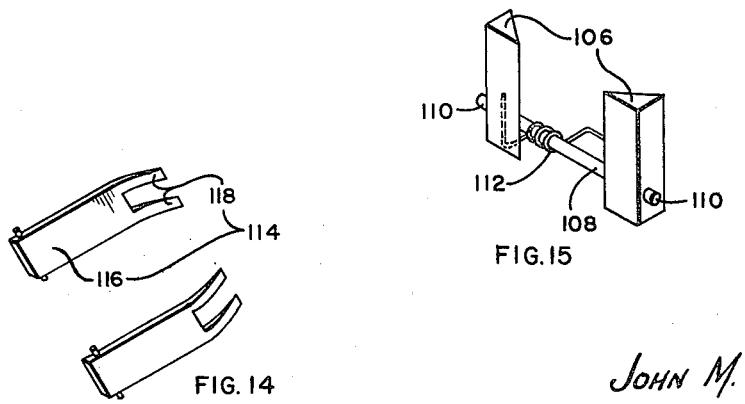
FIG. 14 is a composite illustration of the orienting spring fingers for the cartridges associated with the feed mechanism.
FIG. 15 is a pictorial illustration of the stop abutments associated with the feed mechanism and the orienting fingers of FIG. 14.
Figure 16:
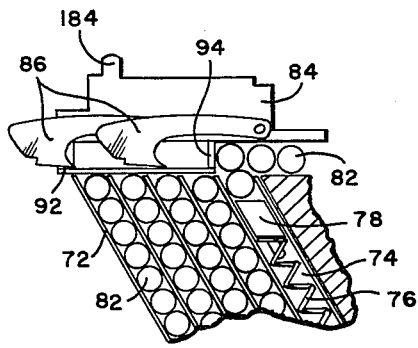
FIGS. 16 through 21 are side elevations diagrammatically illustrating the sequence of the feed mechanism operation with respect to the magazine of the handgun.
Figure 17:
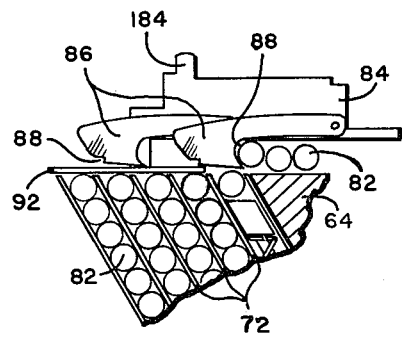
Figure 18:
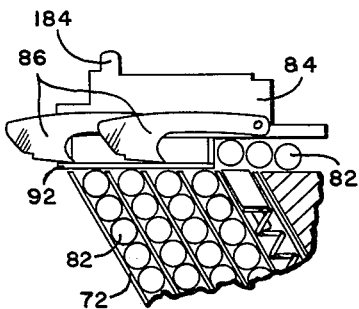
Figure 19:
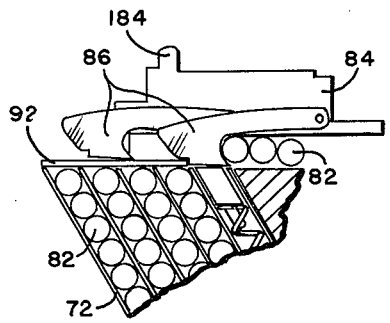
Figure 20:
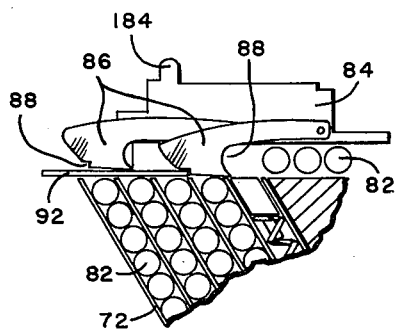
Figure 21:
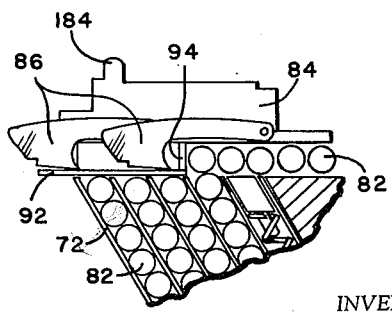

A pair of stub posts 106, FIG. 15, is vertically positioned relative to the frame rearwardly of the point of magazine entry into the receiver. The posts are spaced apart transversely of the frame and are pivotally supported on their lower ends by a transverse pin 108 having the extended ends 110 thereof rotatably supported in the frame. The pin is provided in typical fashion with a convolutely wound spring 112 normally urging the posts 106 to pivot to a vertical position toward the forward end of the gun. Functionally associated with the stub posts 106 is a pair of orienting spring fingers 114, FIG. 14, each of which consists of a flat base portion 116 which is secured longitudinally to one or the other of the side walls of the receiver to present an arcuate, bifurcated end section 118 curving rearwardly and inwardly of the side walls of the receiver. The spring fingers are secured to the receiver walls so as to locate the rearwardmost bifurcated ends of the fingers forwardly of the frame supported posts 106 when the barrel and receiver are in normal, at-rest position as seen in FIG. 8.

Located immediately rearwardly of the spring fingers 114 is a cartridge carrier, generally designated at 120, FIG. 22, which consists of a short semi-tubular member 122 located on the longitudinal centerline of the gun and having a pair of arms 124 pivotally interconnecting each side of the tubular member with the adjacent side walls of the receiver, FIG. 9. The lower arm on each side of the tube is connected by a tension spring 126, FIG. 6, to a lower point on the rear wall of the receiver which normally biases these arms upwardly. The inner wall of the tube member 122 is longitudinally curvilinear with the smallest inside diameter occurring intermediate the tube length and approximating the diameter of the rim of a cartridge of the same caliber as the caliber of the handgun.

In operation of the feed mechanism, the rearwardmost ratchet segment 86 will engage, at its lower detent end, the uppermost cartridge 82 in the rearward slot of the magazine and, upon the rearward stroke of receiver recoil, the segment will urge the cartridge rearwardly along the bed plate of the frame. As seen in FIG. 5, three hand-pump operations of the receiver relative to the barrel will place four cartridges from the rearward slot of the magazine between the rearward segment 86 and forward face of the stub posts 106. This positioning of the cartridges will cause the bifurcated end of that spring finger on the receiver wall adjacent the rim of the rearwardmost cartridge to engage about the rim, FIG. 8, whereupon rearward recoil movement of the receiver, FIG. 9, will cause the rim of the cartridge to move rearwardly with the receiver depressing and passing over the spring posts 106 which posts serve to retard the rearward movement of the nose end of the cartridge, and which posts snap up under spring bias after passing the cartridge to restrict rearward movement of the next cartridge in line on the frame plate. The forward stroke of the receiver returning from recoil will cause the spaced posts 106 to cooperatively receive the now angularly positioned cartridge therebetween as the arms 124 guide the cartridge into longitudinal alignment with the gun and urge the rim thereof into the tube member 122 of the carrier, FIG. 9.

Figure 6:
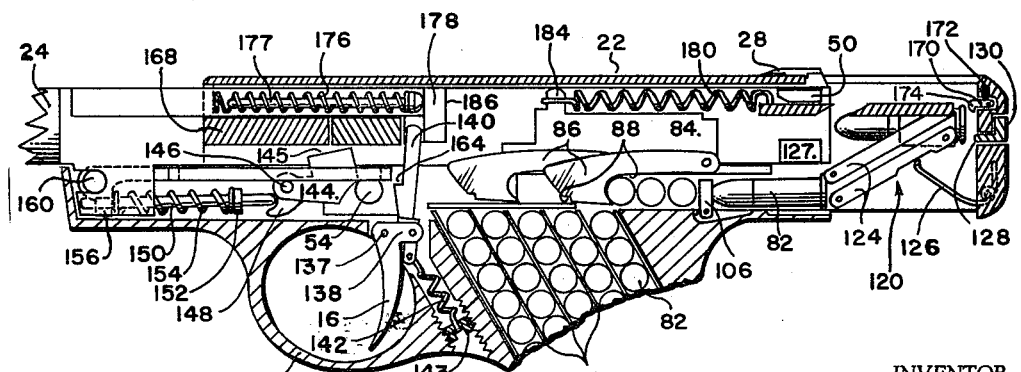
FIG. 6 is a side elevation in vertical section illustrating the operational positioning of the handgun components in recoil condition.

During the rearward stroke of the next recoil of the receiver the bias of spring 126 will lift the carrier arms 124 and tube 122 to position the cartridge therein in alignment with the barrel breech, FIG. 6, while the next cartridge in line is engaged by one of the orienting spring fingers 114 and moved into position for insertion in the carrier tube on the forward stroke of the receiver when the tube has been returned to its lower position by camming action of the barrel block projections 127 on the tube supporting arms 124. This leaves the first cartridge in firing position in the breech end of the barrel.

The foregoing operation of feeding cartridges from the rearwardmost magazine slot continues until the slot is emptied, whereupon the forward detent 88 of the rearwardmost ratchet 86 will engage the rearward edge of hold-down plate 90 and, on forward return stroke of the receiver move the hold-down plate against springs 100 to undercover the next magazine slot from which the uppermost cartridge will pop-up under urging of follower spring 76 into line rearwardly of the depending ends of the ratchet segment 86 on the slide member. Upon each return stroke of the receiver the ratchet segments will ride above and over all cartridges on the frame bed intermediate the second magazine slot and the stub posts 106. After emptying of the two rear magazine slots by the rearwardmost ratchet, the forwardmost ratchet takes over to empty the next three slots of the magazine. As each slot of the magazine is emptied, the above-described advancement of the hold-down plate will be effected until the magazine is empty.

*Firing mechanism*

The mechanism for firing cartridges positioned in the firing chamber or breech end of the barrel 40 of the carrier 122 includes a firing pin 128 located coaxially of and to the rear of the breech end of the barrel. The firing pin 128 is carried as an integral part of a U-shaped firing member 130 which is positioned telescopically about the receiver from the rear thereof to reciprocate longitudinally within the confines of a complementary slot 132, FIG. 10, in the wall of the receiver. The forward end of each leg of the U member 130, FIG. 2, is provided with an inwardly flanged projection 134 presenting a rearwardly disposed shoulder 135 along the adjacent side wall of the receiver, and a forwardly disposed face 136 transversely of the receiver. The trigger 16 is pivotally secured as at 137, FIG. 5, to the frame of the gun and presents a perpendicular leg portion 138 in rearward extension therefrom. The extreme end of the extension 138 of the trigger is pivotally secured to the lower end of the sear disconnect arm 140 which turns outwardly and upwardly within the receiver around the barrel. A spring 142 connects the extreme lower end of arm 140 rearwardly to the flame of the gun. The tension sping 142 is adjustable by screw 143 enabling the operator to obtain the exact trigger pull desired without disassembling the gun to make adjustments. The upper, free end of arm 140 lies in a line with and rearwardly of the shoulder 135 on the firing member projection 134 adjacent the same side wall of the receiver.

Associated with the trigger sear disconnect arm is a pair of generally fan-shaped hammers 144 which are each secured on a rotatably mounted rocker shaft 146 which extends transversely of the receiver forwardly of the sear disconnect arm to locate each of the hammers one closely adjacent each side wall of the receiver. The positioning of hammers 144 as described aligns the forward, flat angular firing face 145, FIG. 6, of each hammer in longitudinal alignment with the adjacent shoulder 135 of firing member projections 134 when the hammers are in uncocked or fired position, FIG. 5.

Each hammer member 144 is provided adjacent its point of pivotal attachment on shaft 146 with a projecting keeper teat 148 which opens outwardly in a direction forwardly of the gun below the shaft 146 to receive therein the rearward end of an elongated pin 150 which is resiliently seated by means of a fixed collar 152 thereon bearing on a coil spring 154 against a depending leg 156 of a substantially right angular bell crank sear arm 158.

The sear arm is pivotally secured in the receiver on pin shaft 160 extending transversely of the receiver closely adjacent the forward end of the frame and receiver. The second perpendicular leg 162 of the sear arm extends for a substantial distance rearwardly within the receiver to engage in a sear catch 164 on the sear disconnect arm 140, FIG. 6.

In operation of the firing mechanism, rearward reciprocation of the receiver will cause each of the projections 134 on firing member 130 to ride back against and over its associated hammer 144 depressing the hammer rearwardly and downwardly from the position shown in FIG. 5 to that shown in FIG. 6, whereupon the sear arm is engaged against a detent 166 (FIG. 5) on the hammer member which is placed in longitudinal opposition to the sear arm by rearward rotation. When the sear arm is engaged in hammer detent 166 the rearward end of the arm is likewise engaged and locked in the sear arm catch 164 on the sear disconnect arm 140.

When the trigger 16 is depressed against the bias of spring 142 the sear disconnect arm 140 is moved sufficiently to disengage the sear arm from the hammer detent 166 permitting the hammer, in response to the bias of spring 154 on pin collar 152, to swing about shaft 146 causing the forward percussion face thereof to strike the shoulder 135 of U-shaped member 130. The hammer blow on shoulder 135 drives the member 130 forwardly a short distance, limited by engagement of face 136 with a fixed block 168 on the receiver, and causes firing pin 128 to strike the firing point of the cartridge positioned in the barrel breech immediately forward therefrom.

*Ejection and reset mechanism*

Associated with the receiver above the firing pin 128 is an extractor member 170 which consists of an arm pivoted to the receiver at its rearward end and interconnected by a spring 172 intermediate its forward length rearwardly to the receiver. The forward end of the arm is provided with a depending hook 174 which is normally located so as to engage over and inside the rim of a cartridge positioned for firing in the barrel breech.

Additionally associated with the reset components of the hand-gun is a pair of recoil springs 176 disposed one longitudinally adjacent each side wall of the receiver. Each recoil spring is seated at its front end against the forward wall of the receiver, and at its rearward end against the head of guide pin 177 which abuts against a wing block 178 carried rigidly on the side of the barrel.

Further, the feed member 84 is provided with a recoil spring 180 secured to the receiver on a projection 182 at its rearward end and to a vertical flange 184 on the member at its forward end. The rearwardly disposed shoulder 186 of wing block 178 on the barrel in front of the flange 184 provides a stop point for forward movement of the feed member on reset motion of the receiver.

In operation of the gun subsequent to the firing of the cartridge in the breech end of the barrel, the receiver, under normal blow-back, will recoil relative to the barrel to the extent permitted by the engagment of firing projections 134 with forwardly disposed faces 188 of wing blocks 178 on the sides of the barrel. As the receiver recoils the shell of the discharged cartridge will be extracted by engagement of hook 174 with the casing rim. When the receiver has moved sufficiently to the rear to draw the shell casing clear of the barrel breech, projections 134 strike blocks 188 causing member 130 to become stationary while receiver 22 continues to recoil rearwardly a fraction of an inch until block 168 strikes shoulder 136 of the now stationary member 130. This action forces firing pin 128 forward of the receiver sufficiently to kick the empty casing from the grip of hook 174 outwardly and rearwardly through the cut-away, open upper receiver wall at 26.

Simultaneously with the ejection of the discharged shell casing, the feed member 84 is drawn rearwardly under bias of spring 180 moving a new cartridge through the orientation stage to a position for insertion in the cartridge carrier 122. Still during the same rearward movement of the receiver, the carrier is withdrawn from beneath the barrel permitting spring 126, FIG. 6, to raise the carrier to align the live shell therein with the open breech end of the barrel.

On the return stroke of the receiver, under bias of springs 176, carrier 122 is cammed downwardly by stationary wing blocks 127 affixed to barrel 24 leaving a live cartridge in the breech end of the barrel, and upon returning to its lowered position the carrier receives the next live shell telescopically therein from the feed member. At the same time, feed member 84 is urged forwardly with ratchet members 86 riding over the cartridges lying along the frame to bring the appropriate ratchet member into engagement with the next shell elevated onto the frame as the plate 90 uncovers the active magazine slot.

From this operational stage, the sequence is again repeated commencing with the firing of the live shell causing receiver blowback, ejecting the empty shell casing, feeding a new shell into the breech end of the barrel with raising of the carrier, and upon return reset motion of the receiver to position a new live shell in the carrier for the subsequent operation.

The handgun is additionally provided with a safety mechanism which consists of a latch button 192 pivotally mounted in a recess 193 in the side wall of receiver 22 above the trigger. When the latch button is moved upwardly it locks into detent 194, FIG. 2, formed on the forwardly projecting leg of firing member 130 thus locking firing pin 128 out of engagement with a cartridge in the breech end of the barrel. When the safety mechanism is thus engaged, all that is required to disarm the gun without removing the live cartridge from the barrel breech is to pull the trigger releasing hammers 144 permitting them to move to positions of rest. To rearm the gun without pulling back receiver 22, which would act to eject the live cartridge from the barrel breech, it is only necessary to pull back firing member 130 independently of the receiver thereby releasing the safety catch and recocking hammers 144.

From the foregoing description of construction and operational details of the handgun constituting the present invention, and the combinations and sub-combinations thereof shown and described, it is evident that novel and useful innovations and improvements have been made in the art which serve to satisfy and attain all of those objects and advantages hereinbefore set forth.

Further, the foregoing descriptions and disclosures are made for the purpose of showing operable embodiments of my inventive concepts without intention to limit the spirit or scope of my invention beyond the requirements of the prior art.

Accordingly, what is desired to be claimed is:

1. A handgun comprising, a frame and handgrip stock, a barrel fixed on the frame, a receiver slidable on the barrel, a magazine in said stock supporting cartridges transversely thereof and perpendicular to a vertical-plane containing the axis of the barrel, feeding and orienting means in said receiver transferring said cartridges from the magazine into firing position in said barrel, and firing mechanism including a trigger and firing pin.

2. A handgun as defined in claim 1 wherein said barrel projects rearwardly beyond the handgrip stock and presents a breech end therein located rearwardly from the magazine, and said firing pin being positioned rearwardly of the breech end of the barrel and being supported independently of said receiver.

3. A handgun as defined in claim 1 wherein said handgrip magazine includes a plurality of cartridge carrying passages front to rear of the stock, spring followers in each passage, and said passages each opening upwardly into the receiver.

4. A handgun as defined in claim 1 wherein the handgrip stock depends angularly from said frame intermediate the frame length, and said barrel and receiver extend throughout the length of said frame with the fixed barrel projecting forwardly from within the slidable receiver.

5. A handgun as defined in claim 1 wherein said receiver is cut away above the rearward end of the barrel and rearwardly of said handgrip stock, and a rear sight member is fixed on said barrel to project vertically through said cut-away receiver.

6. A handgun as defined in claim 1 wherein said handgrip consists of a hollow stock, a removable end piece on said stock, a plurality of divider plates secured in said end piece in spaced relationship and telescopic in said stock to define plural passages lengthwise thereof in front to rear relationship, and spring followers between adjacent plates and secured in the removable end piece of said stock.

7. In a handgun including a frame and depending handgrip stock intermediate the frame length, a barrel rigidly fixed on the frame, and a receiver reciprocally housing the barrel throughout the frame length, the combination; a magazine in said handgrip opening into the receiver and supporting plural rows of cartridges transversely therein perpendicular to the vertical plane containing the axis of the barrel and in random end to end relationship; a feed assembly including a feed member reciprocal within said receiver, plural inclined ratchet members on said feed member and movable therewith relative to the magazine opening into the receiver, and means engaging and turning cartridges under influence of said feed member through a 90° arc.

8. In a handgun including a frame and a pistol grip stock, a barrel rigidly fixed on and extending throughout the length of the frame and a reciprocal receiver slidably engaged about the barrel; a magazine in said handgrip communicating with said receiver, plural divider strips transversely partitioning said handgrip to form cartridge passages longitudinally thereof, a feed member in said receiver moving cartridges from said magazine to a firing position, and orienting means associated with said feed member and cooperating therewith to properly position said cartridges to enter their firing position.

9. A semi-automatic handgun comprising, a frame and a handgrip stock, a barrel rigidly fixed on said frame and projecting rearwardly beyond said stock, a receiver telescoped over the rear of said barrel and reciprocal on said frame, a cartridge magazine in said stock communicating with said receiver, feed means in said receiver engaging and transferring cartridges from said magazine to said barrel, a firing member slidable on said receiver and supporting a firing pin rearwardly of said barrel, and trigger means operable to actuate said firing member.

10. A handgun construction as defined in claim 9 including a safety catch pivotally supported in a wall of said receiver, and latch means operable by said catch to selectively engage and lock said firing member.

11. A handgun construction as defined in claim 9 wherein said receiver is cut away above a rearward portion of said barrel, and spring biased shell extractor means are mounted on said receiver in association with said barrel and adjacent said cut away portion.

12. A handgun construction as defined in claim 9 including a pin member transversely interconnecting said barrel and frame, and resilient means retaining said pin in engagement with said gun components.

13. A handgun comprising, a frame and a handgrip stock, a barrel rigidly fixed on the frame, a receiver slidable on said frame and barrel, a magazine in said stock supporting cartridges transversely thereof and perpendicular to a vertical plane containing the axis of the barrel, a plurality of rearwardly inclined ratchet members slidable in the receiver above said magazine, spring seated posts rearwardly of the ratchet members in the path of cartridge feed, resilient fingers in said receiver engageable with the rims of cartridges in the region of said posts, a semi-tubular carrier rearwardly of said posts and spring biased upwardly in the receiver to the rear of said barrel, and firing mechanism including a trigger and firing pin.

14. A handgun comprising, a frame and a handgrip stock, a barrel fixed on the frame, a receiver slidable on the barrel and the frame, a magazine in said stock supporting cartridges transversely thereof and perpendicular to a vertical plane containing the axis of the barrel, feeding and orienting means in said receiver transferring said cartridges from the magazine into firing position in said barrel, a trigger supported adjacent said handgun stock, spring means having adjustable tension engaging and biasing said trigger within the receiver, an elongated U-shaped firing member slidable on said receiver including and presenting a firing pin at the rear of said barrel, and percussion faces on said firing member to be struck by said hammer members disposed one in the arc of striking movement of each hammer member forwardly of the trigger.

15. A handgun comprising, a frame and a handgrip stock, a barrel fixed on the frame, a receiver slidable on the barrel, a magazine in said stock supporting cartridges transversely thereof and perpendicular to a vertical plane containing the axis of the barrel, feeding and orienting means in said receiver transferring said cartridges from the magazine into firing position in said barrel, a trigger positioned forwardly of the handgrip stock, spaced pivotal hammers mounted in the receiver forwardly of the trigger, a firing member slidable in said receiver and presenting a firing pin centrally of the rear of the barrel, and projections on said firing member disposed in the arc of striking movement of said hammers to be struck thereby.

References Cited in the file of this patent

UNITED STATES PATENTS

| | | |
|---|---|---|
| 2,090,657 | Williams | Aug. 24, 1937 |
| 2,112,268 | Burton | Mar. 29, 1938 |
| 2,358,792 | Conway | Sept. 26, 1944 |
| 2,498,155 | De Jonge | Feb. 21, 1950 |
| 2,509,553 | Wylie | May 30, 1950 |
| 2,705,847 | Kramer | Apr. 12, 1955 |
| 2,828,568 | Sakewitz | Apr. 1, 1958 |
| 2,851,929 | Milroy | Sept. 16, 1958 |
| 2,945,422 | Allyn | July 19, 1960 |
| 2,958,974 | Sefried | Nov. 8, 1960 |

FOREIGN PATENTS

| | | |
|---|---|---|
| 213,444 | Switzerland | May 16, 1941 |